Dec. 10, 1963  F. B. AIRHEART ETAL  3,113,646
VEHICLE BRAKING UNIT
Filed April 26, 1962
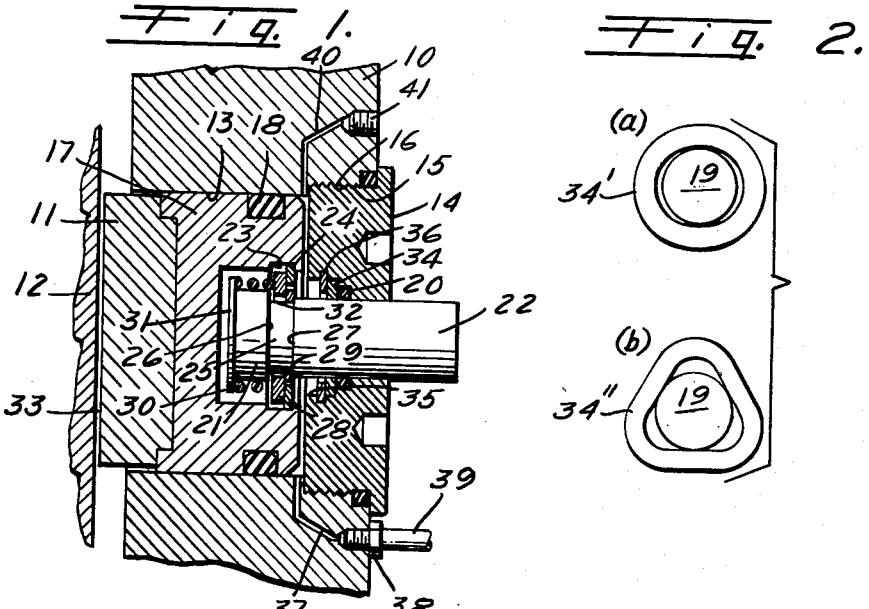
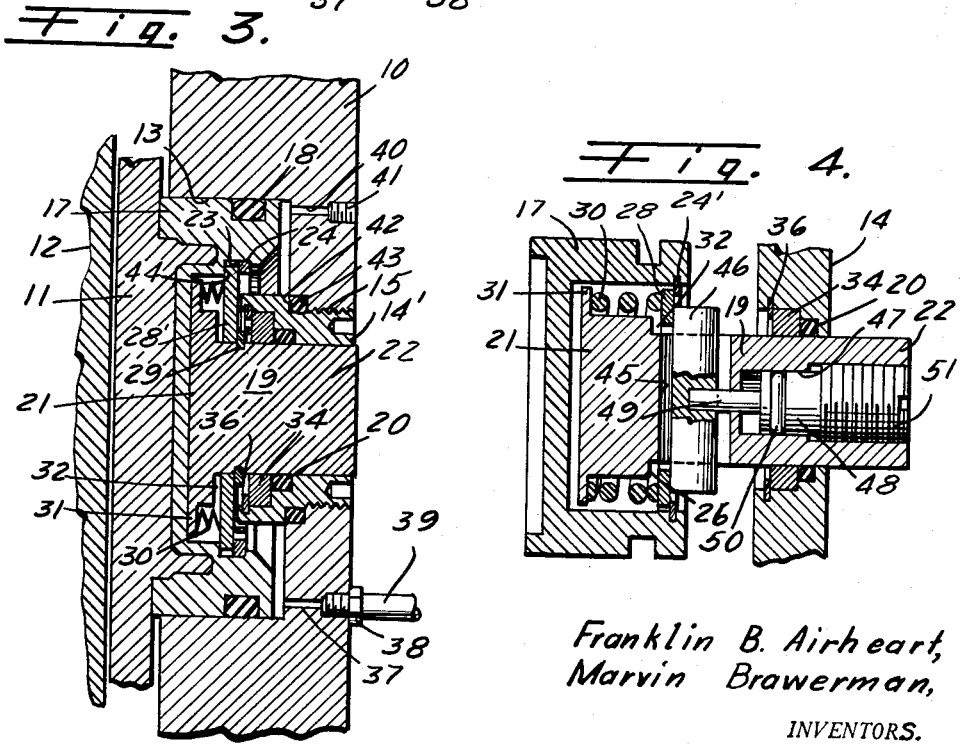
Franklin B. Airheart,
Marvin Brawerman,
INVENTORS.
Robert M. McManigal
Attorney

United States Patent Office 3,113,646
Patented Dec. 10, 1963

3,113,646
VEHICLE BRAKING UNIT
Franklin B. Airheart, Sepulveda, and Marvin Brawerman, Pacoima, Calif., assignors to Airheart Products, Inc., Van Nuys, Calif., a corporation of California
Filed Apr. 26, 1962, Ser. No. 190,320
7 Claims. (Cl. 188—196)

The present invention relates generally to brakes for wheeled vehicles, and is more particularly concerned with means for automatically compensating for brake wear, and for adjustably varying the extent of brake clearance.

More specifically, the present invention constitutes improvements in braking mechanisms of the type disclosed in United States Letters Patent No. 2,905,277, issued September 22, 1959, to Toby T. Cagle.

It is one object of the herein described invention to provide a power actuated brake of compact simplified construction in which the parts are so arranged as to enable more economical fabrication; which is more easily assembled, and wherein undesirable air traps which may interfere with bleeding of the unit are substantially eliminated.

A further object of the invention is to provide novel means for adjusting the corrective clearance of the unit, the mechanism for such purpose being so arranged that it is readily accessible from the exterior without the necessity of having to disassemble the unit.

Briefly, the present invention comprises power means for actuating the brake elements, the power means comprising a cylinder which is closed at one end and within which there is mounted a main piston and an auxiliary piston in coaxial relationship and having innermost ends juxtaposed. The auxiliary piston is reciprocably mounted in the closure with a holding device which normally retains the auxiliary piston against movement except when a predetermined frictional holding force thereof is exceeded. The adjacent ends of the pistons are interconnected for limited relative axial movements which are confined during normal operation to predetermine limits which constitute the brake clearance space when the brake is in released position. Normally, under operation, the braking elements are actuated within the predetermined limits or clearance space until such time as the brake wear becomes so great that the brake will not set up tightly within the predetermined limits of movement. Under such conditions, the actuating pressure applied to the brake piston causes relative movement beyond the predetermined limits as the result of exerting a force which is greater than the friction holding force applied to the auxiliary piston. The auxiliary piston is then moved to take up for the brake wear, and upon release of the brake, the piston will again be withdrawn by means of a compression spring to again establish the operation with normal brake clearance.

As a further feature of the invention, one of the limits which establish the brake clearance space is formed by means of a movably mounted element which is actuatable by manually operable adjusting means accessible from the end of the auxiliary piston which projects beyond the closed end of the cylinder.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a diametral section taken through a brake operating mechanism embodying the features of the present invention, certain of the parts being shown in elevation for clearness;

FIG. 2 is a detail view illustrating distorted gripping rings of the type which may be utilized in the holding device for the auxiliary piston;

FIG. 3 is a section view showing a modified embodiment of the invention in which the auxiliary piston is supported in an inwardly removable cylinder closure member; and FIG. 4 is a fragmentary sectional view illustrating a modified arrangement in which the details of the clearance adjusting mechanism are shown.

Referring generally to the accompanying drawings for illustrative purposes, the present invention is shown in FIG. 1 as embodying a body structure as generally indicated by numeral 10, which houses the brake actuating mechanism for moving an associated braking element or shoe 11 into and out of engagement with a brake drum or companion braking element 12 associated with the vehicle wheel, and against which the braking forces are adapted to be applied.

The body structure may assume various configurations, but generally is formed with a cylindrical bore 13 which forms a cylinder of the operating mechanism for the brakes. This cylindrical bore is open at one end, and is closed at the opposite end by means of a closure wall structure which may include a bushing 14 having an inner end 15 adapted to threadedly engage a wall opening 16 formed at this end of the cylindrical bore.

Operatively supported within the cylindrical bore 13 is a main piston 17 of cup-shaped construction, this piston having an outer end arranged to engage with the brake shoe 11, and being provided on its peripheral surface with a recessed O-ring 18 adapted to make sealing engagement with the inner wall of the cylinder.

There is also mounted within the cylindrical bore 13 an auxiliary piston 19 of cylindrical configuration, this piston being coaxial with the main piston and being supported for reciprocable movements in the bushing 14, this bushing having a recessed O-ring 20 for contact sealing with the outer surface of the auxiliary piston. As thus mounted, the auxiliary piston has an inner head portion 21 positioned within the cup-shaped inner end of the main piston 17, and an outer projecting end 22 which extends outwardly of the bushing 14 where it may be visually observed.

Internally, the inner wall of the main piston is provided with a circumferentially extending groove 23 within which there is mounted a removable inwardly projecting snap ring 24 which surrounds the auxiliary piston adjacent to its inner head portion 21. Radially inwardly of the groove 23, the auxiliary piston is likewise provided with a circumferentially extending groove 25 which opens outwardly towards the groove 23. The groove 25 is formed on one side with a radially extending shoulder 26 and on its opposite side with a shoulder 27 of somewhat lesser height in order to permit passage of a ring member 28 thereover into a position within the groove 25 where it may abut against the shoulder 26. The ring member is retained against removal by means of a retaining snap ring 29 which now in effect forms an abutment shoulder in spaced relation to the abutment shoulder 26 and permits limited movement of the ring member 28 axially of the groove 25, the extent of this movement constituting the brake clearance as will hereinafter be explained more fully. The ring member 28 is of such outer diameter as to overlap the inner marginal edge of the snap ring 24. A compression spring 30 surrounds the head portion of the auxiliary piston, one end of this spring bearing against a projecting end flange 31, and the other end bearing against the ring member 28.

With the parts as thus arranged, it will be apparent that the main piston and auxiliary piston are interconnected for limited axial movement and that under normal conditions, the spring 30 will maintain the ring member 28 against the abutment formed by the retaining snap ring 29 so that a clearance space 32 will exist between the shoulder 26 forming the other abutment and the adjacent surface of the ring member 28. The clearance space 32 corresponds with the brake clearance 33. It will now be apparent that if the main piston is energized for braking action, the main piston may move towards a braking position within the extent of the clearance space 32. However, it will be appreciated that as the brake shoe continues to wear, a condition will eventually be reached in which movement of the main piston towards a braking position through the limits of the clearance space 32 will be ineffectual to provide the required braking effect between the braking elements. Under such conditions, a new position of the auxiliary piston will be established with respect to its normal support position in the bushing 14. Movement of the auxiliary piston to the new position is accomplished by engagement of the ring member 28 with the shoulder 26, and the extent of the movement of the auxiliary piston will correspond to that required to establish proper braking engagement between the braking elements. Upon deenergization of the main piston, the spring 30 will then retract the main piston and again establish the required brake clearance 33.

A holding device is provided for normally holding the auxiliary piston against axial movement, except when it becomes necessary to exceed the limited movement of the main piston as established by the movement of the ring member 28 as just described above. The holding device comprises a grip ring 34 which surrounds the auxiliary piston, this ring being seated within a recess 35 in the inner end of the bushing 14 and retained therein by means of a retaining snap ring 36. Various structures may be utilized to provide a frictional restraining force against the auxiliary piston, however, in the present instance this is accomplished by distorting the ring 34 as shown in FIG. 2. FIG. 2a shows a grip ring 34' which in this case is distorted into an ellipse in which the minimum axis is normally less than the diameter of the auxiliary piston. Thus, when the ring is forced over the auxiliary piston and installed as shown in FIG 1, the ring will frictionally grip and hold the piston against axial movement until the gripping force is exceeded. FIG. 2b shows a ring 34" which is of triangular configuration, this ring operating on the same principles as that of ring 34'.

It will be obvious that as the auxiliary piston is moved inwardly to compensate for the wear of the brake shoe, the position of the auxiliary piston as viewed from its projecting exposed outer end 22 will serve as a visual indicator of the amount of wear of the brake shoe.

Operating fluid is supplied through a passage 37 into the cylinder for operating the pistons and actuating the braking elements. The passage 37 is brought out to a connection fitting 38, this fitting being adapted for terminal connection with a conduit 39 through which actuating fluid may be supplied from a suitable source. In order to assure proper operation, it is desirable to provide a bleed arrangement in order that entrapped air may be eliminating. A bleed passage 40 is provided, this passage having its outlet end normally closed by a removable plug 41.

The operations described above constitute the usual normal operating conditions. However, a different operating condition may prevail where, for example, the brake shoe 11 is in engagement with the braking element 12, when the main piston is in brake releasing position. Such a condition may result from a variety of causes such as the installation of a new braking shoe, or the expansion of the shoe or braking element due to heating and other factors which may cause a physical change in these parts. When the fluid pressure is applied within the cylinder, this pressure cannot cause movement of the main piston because the brake shoe is already against the braking element 12. It will be apparent that if the brake shoe clearance is not readjusted, the brake shoe cannot move away from the braking element 12 when the actuating pressure is released. Thus, under such circumstances, when the actuating pressure is applied to the cylinder, and since the main piston cannot move in a brake setting position, this pressure will act to move the auxiliary piston outwardly until the ring member 28 is engaged by the shoulder 26. In order to effect this movement, the force applied to the auxiliary piston must exceed the frictional force of the holding device. Built-in clearance is thus automatically re-established.

The arrangement shown in FIG. 3 of the drawings is a modification in which the physical structure has been somewhat modified, but which includes the basic principles of operation inherent in the previously described device. In the modified structure, similar numerals have been utilized to indicate the various elements which correspond to those which are embodied in the arrangement described and shown in FIG. 1.

Referring more specifically to FIG. 3, this modification differs from that previously described primarily in that the bushing 14' is in this case constructed so that it may be put in from the interior through the cylinder rather than exteriorly as shown in FIG. 1. In other words, the entire assembly of parts may be made from the braking side of the unit. This is advantageous in certain types of installations. In this case, the bushing is provided with a peripheral sealing inner flange 42 adapted to engage with an O-ring 43 recessed in the body structure 10.

In this modification, the ring member indicated as 28' is fixedly mounted in the groove 23 and retained against axial movement by the cooperative action of the snap ring 24 and the side wall 44 of the groove 23.

Referring now to FIG. 4, an arrangement is disclosed which permits the brake clearance to be manually adjusted whenever desired, this adjustment being accomplished from the exterior of the unit without the necessity of having to disassemble any of the operative parts of the unit.

As shown, the auxiliary piston from the shoulder 26 to the outer end thereof is made of uniform diameter, and the groove 23 as such has been eliminated. In order to provide for limited movement of the ring member 28, in this modified arrangement the auxiliary piston is provided with a transverse passage 45 within which there is positioned a bar member 46, the ends of this bar extending outwardly beyond the periphery of the auxiliary piston to form abutments against which the ring 28 may engage under the action of spring 30.

The width of the transverse passage 45 axially of the auxiliary piston is greater than that of the width of the bar 46 so as to provide a space within which the bar may be laterally adjusted so as to vary the space 32 and the consequent brake clearance.

In order to provide for adjusting the bar 46, the outermost end of the auxiliary piston is provided with an axially positioned end opening recess 47 within which there is reciprocably mounted a slide member 48 which carries a projecting stem 49, this stem extending through the bottom wall of the recess 47 and being seated in the bar 46. Thus the stem 49 retains the bar in a longitudinal direction within the transverse passage 45. The slide member 48 is peripherally sealed by a circumferentially extending O-ring 50. The position of the slide member 48 is adjustably variable by means of a screw end 51 having threaded engagement with the outermost end wall of the recess 47. Rotation of the screw end 51 in one direction will act to decrease the brake clearance, while rotation of the screw end in the opposite direction will increase the clearance.

Various modifications may suggest themselves to those skilled in the art without departing from the spirit of our invention, and, hence, we do not wish to be restricted to the specific form or forms shown or uses mentioned, except to the extent indicated in the appended claims.

We claim:
1. Braking mechanism, comprising:
   (A) cooperable braking elements mounted for relative movements into and out of engagement;
   (B) a cylinder;
   (C) a main piston for actuating one of said braking elements;
   (D) an auxiliary piston having a longitudinal axis coaxial with the main piston axis, said pistons having adjacently positioned inner ends;
   (E) axially spaced abutments carried by the auxiliary piston adjacent its inner end;
   (F) an annular stop member carried by said main piston surrounding the auxiliary piston and positioned for limited movement between said abutments to establish a predetermined clearance;
   (G) a compression spring extending between the inner end of said auxiliary piston and said stop member;
   (H) means for applying a fluid pressure between the inner ends of the pistons, said pressure acting each time it is applied to relatively move the pistons in opposite directions to the extent of said limited movement and establish said predetermined clearance; and
   (I) a holding device for releasing said auxiliary piston for movement respectively in opposite directions when a predetermined holding force is exceeded, said holding device including
      (a) a ring member having preset frictional gripping relation with said auxiliary piston.

2. Brake actuating mechanism having provision for establishing a predetermined clearance between a brake surface and a braking element each time it is operated and for indicating the extent of wear of such braking element, comprising:
   (A) a cylinder;
   (B) a closure at one end of said cylinder;
   (C) a brake actuating main piston reciprocable in said cylinder;
   (D) an auxiliary piston having a longitudinal axis coaxial with the main piston axis, said auxiliary piston extending through said closure and having an inner end head portion;
   (E) axially spaced abutments carried by the auxiliary piston adjacent said head portion;
   (F) an annular stop member movable with said main piston surrounding the auxiliary piston and extending radially inwardly from the main piston into the space between said abutments for limited movements therebetween;
   (G) a compression spring extending between the head portion and said stop member;
   (H) means for applying an actuating fluid pressure against the inner ends of the pistons to relatively move the pistons in opposite directions to the full extent of said limited movement each time the actuating pressure is applied; and
   (I) a holding device for releasing said auxiliary piston for movement respectively in opposite directions when a predetermined holding force is exceeded, said holding device including
      (a) a deformed ring between the closure and auxiliary piston surrounding and frictionally gripping the exterior surface of said auxiliary piston with a preset force.

3. Brake actuating mechanism having provision for establishing a predetermined clearance between a brake surface and a braking element each time it is actuated and for indicating the extent of wear of such braking element, comprising:
   (A) a cylinder;
   (B) an inwardly removable closure at one end of said cylinder;
   (C) a brake actuating main piston reciprocable in said cylinder;
   (D) an auxiliary piston having a longitudinal axis coaxial with the main piston axis, said auxiliary piston extending through said closure and having an inner end head portion;
   (E) axially spaced abutments carried by the auxiliary piston adjacent said head portion;
   (F) an annular stop member movable with said main piston surrounding the auxiliary piston and having an inner peripheral edge margin positioned for limited movement between said abutments;
   (G) a compression spring extending between the head portion and said stop member;
   (H) means for applying an actuating fluid pressure against said pistons to relatively urge the pistons away from each other to the full extent of said limited movement each time the pressure is applied; and
   (I) a holding device for releasing said auxiliary piston for movement respectively in opposite directions when a predetermined holding force is exceeded, said holding device including
      (a) a deformed ring between the closure and auxiliary piston surrounding and frictionally gripping the exterior surface of said auxiliary piston.

4. Brake actuating mechanism having provision for taking up excessive clearance between a brake surface and a braking element and for indicating the extent of wear of such braking element, comprising:
   (A) a cylinder;
   (B) a closure at one end of said cylinder;
   (C) a brake actuating main piston reciprocable in said cylinder;
   (D) an auxiliary piston coaxial with the main piston extending through said closure and having an inner end head portion;
   (E) first abutment forming means on said auxiliary piston;
   (F) second abutment forming means on said auxiliary piston spaced from said first abutment means, said first and second abutment means being supported for relative spacing variation;
   (G) annular stop means movable with said main piston surrounding the auxiliary piston and having a portion extending between said abutment means for limited movement establishing the brake clearance;
   (H) means accessible from the exterior of said cylinder for adjustably varying the positions of said abutment means to vary said spring and the consequent clearance;
   (I) a compression spring extending between the head portion and said stop member;
   (J) means for applying an actuating fluid pressure against said pistons to relatively urge the pistons away from each other to the full extent of said limited movement between the adjusted abutment means; and
   (K) a holding device for releasing said auxiliary piston for movement respectively in opposite directions when a predetermined holding force is exceeded, said holding device including
      (a) a ring member in gripping relation to said auxiliary piston.

5. Brake actuating mechanism having provision for taking up excessive clearance between a brake surface and a braking element and for indicating the extent of wear of such braking element, comprising:
   (A) a cylinder;
   (B) a closure at one end of said cylinder;
   (C) a brake actuating main piston reciprocable in said cylinder;
   (D) an auxiliary piston coaxial with the main piston extending through said closure and having an inner end head portion;
(E) an abutment shoulder surrounding the head portion;
(F) a transverse passage in said auxiliary piston;
(G) a bar supported in said passage for lateral movement therein, said bar having its opposite ends projecting beyond the auxiliary piston outer surface so as to form radial abutments spaced from said abutment shoulder;
(H) means forming an internal circumferential projection on said main piston;
(I) a ring member surrounding said auxiliary piston positioned for axial limited movement between said abutment shoulder and the radial abutments, and peripherally engageable with said circumferential projection;
(J) a compression spring surrounding said auxiliary piston and extending between said head portion and said ring member;
(K) means for adjustingly varying the position of said bar including
 (a) a screw member at the outer end of the auxiliary piston;
(L) means for applying a fluid pressure to relatively move the pistons to the extent of said limited movement; and
(M) a holding device for releasing said auxiliary piston for movement respectively in opposite directions when a predetermined holding force is exceeded, said holding device including
 (a) a ring member in gripping relation to said auxiliary piston.

6. Brake actuating mechanism having provision for taking up excessive clearance between a brake surface and a braking element and for indicating the extent of wear of such braking element, comprising:
(A) a cylinder;
(B) a closure at one end of said cylinder;
(C) a brake actuating main piston reciprocable in said cylinder;
(D) an auxiliary piston coaxial with the main piston extending through said closure and having an inner end head portion;
(E) an abutment shoulder surrounding the head portion;
(F) a transverse passage in said auxiliary piston;
(G) a bar supported in said passage for lateral movement therein, said bar having its opposite ends projecting beyond the auxiliary piston outer surface so as to form radial abutments spaced from said abutment shoulder;
(H) means forming an internal circumferential projection on said main piston;
(I) a ring member surrounding said auxiliary piston positioned for axial limited movement between said abutment shoulder and the radial abutments, and peripherally engageable with said circumferential projection;
(J) a compression spring surrounding said auxiliary position and extending between said head portion and said ring member;
(K) an axially extending recess opening into the outer end of said auxiliary piston;
(L) a slide member reciprocable in said recess having
 (a) a peripheral seal, and
 (b) a connection through the recess bottom with said bar;
(M) screw means in the outer end of said recess for adjusting the position of said slider member;
(N) means for applying a fluid pressure to relatively move the pistons to the extent of said limited movement; and
(O) a holding device for releasing said auxiliary piston for movement respectively in opposite directions when a predetermined holding force is exceeded, said holding device including
 (a) a ring member in gripping relation to said auxiliary piston.

7. Brake actuating mechanism for actuating cooperable braking elements mounted for relative movement into and out of engagement and for establishing and maintaining a predetermined clearance between such braking elements, said mechanism comprising:
(A) a cylinder;
(B) a closure at the outer end of said cylinder;
(C) a main piston movable in an inward direction in said cylinder for moving one of said braking elements in a brake applying direction;
(D) an auxiliary piston coaxial with the main piston within said cylinder extending through said closure;
(E) a head portion on the inner end of said auxiliary piston;
(F) axially spaced inwardly and outwardly facing fixed abutments on said auxiliary piston adjacent its head portion;
(G) an annular stop member movable with said main piston surrounding the inner end of said auxiliary piston and extending radially inwardly from the main piston into a space and for movement therein between said abutments;
(H) gripping means between said auxiliary piston and said closure and surrounding and gripping the exterior surface of said auxiliary piston with a preset force;
(I) a compression spring member surrounding said auxiliary piston between said head portion and said annular stop member and resiliently urging said main piston outwardly of said cylinder to a brake releasing position in which said inwardly facing abutment on said auxiliary piston engages said annular stop member to establish a predetermined brake clearance; and
(J) means for applying a fluid pressure to said cylinder between said pistons to move said main piston inwardly of said cylinder in brake applying direction, said auxiliary piston overcoming the gripping action of said gripping means and moving with said main piston in the brake applying inward direction thereof when there is an excessive brake clearance such that said outwardly facing abutment on said auxiliary piston engages said annular stop member prior to full application of the brake, and, when the brake clearance is below the predetermined value the fluid pressure within said cylinder moving said auxiliary piston outwardly of said cylinder against the gripping action of said gripping means until said outwardly facing abutment engages said annular stop member.

References Cited in the file of this patent

UNITED STATES PATENTS

| | | |
|---|---|---|
| 2,568,858 | Kovac | Sept. 25, 1951 |
| 2,644,549 | Cagle | July 7, 1953 |
| 2,803,314 | Halibrand | Aug. 20, 1957 |
| 2,844,223 | Runner | July 22, 1958 |
| 2,951,560 | Smellie | Sept. 6, 1960 |
| 3,019,859 | Marsh | Feb. 6, 1962 |

FOREIGN PATENTS

| | | |
|---|---|---|
| 1,149,481 | France | July 15, 1957 |